(12) United States Patent
Herwig

(10) Patent No.: US 10,715,579 B2
(45) Date of Patent: Jul. 14, 2020

(54) METHODS AND APPARATUS FOR DOWNLOADING DIGITAL CONTENT

(75) Inventor: Nathaniel C. Herwig, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 882 days.

(21) Appl. No.: 13/222,024

(22) Filed: Aug. 31, 2011

(65) Prior Publication Data
US 2013/0054752 A1    Feb. 28, 2013

(51) Int. Cl.
*G06F 15/16* (2006.01)
*H04L 29/08* (2006.01)
*H04L 29/06* (2006.01)

(52) U.S. Cl.
CPC ............ *H04L 67/06* (2013.01); *H04L 69/14* (2013.01)

(58) Field of Classification Search
CPC ....... H04L 67/06; H04L 69/14; G06Q 20/322; H04W 84/042
USPC ........................................ 709/219, 217, 227
See application file for complete search history.

(56) References Cited

U.S. PATENT DOCUMENTS

| | | | | |
|---|---|---|---|---|
| 2003/0134645 A1* | 7/2003 | Stern | ...................... | H04W 4/02 455/456.1 |
| 2005/0257013 A1* | 11/2005 | Ma | ...................... | G06F 3/0605 711/151 |
| 2006/0288040 A1* | 12/2006 | Boerger | ............ | G06F 17/30091 |
| 2009/0119177 A1* | 5/2009 | John et al. | ...................... | 705/14 |
| 2009/0158311 A1* | 6/2009 | Hon | ....................... | H04H 60/31 725/14 |
| 2010/0057563 A1* | 3/2010 | Rauber | ................... | G06Q 30/02 705/14.53 |
| 2010/0070895 A1* | 3/2010 | Messer | ..................... | G06F 3/00 715/764 |
| 2010/0133335 A1* | 6/2010 | Maguid | .................. | G06Q 20/20 235/380 |
| 2010/0174598 A1* | 7/2010 | Khan | ....................... | G06Q 30/02 705/14.32 |
| 2011/0030069 A1* | 2/2011 | Koukine | ................. | G06F 21/10 726/29 |
| 2011/0096354 A1* | 4/2011 | Liu | ......................... | G06F 3/1204 358/1.15 |
| 2011/0099293 A1* | 4/2011 | Ait-Ameur | ....... | H04L 29/12245 709/245 |
| 2011/0158126 A1* | 6/2011 | Claessen | ............... | H04W 16/28 370/254 |
| 2011/0243068 A1* | 10/2011 | Kim | ..................... | H04L 65/1073 370/328 |
| 2012/0278192 A1* | 11/2012 | Shirron | ................ | G06Q 20/123 705/26.1 |
| 2013/0013414 A1* | 1/2013 | Haff | ................... | G06Q 30/0241 705/14.64 |

(Continued)

*Primary Examiner* — Oscar A Louie
*Assistant Examiner* — Oluwatosin M Gidado
(74) *Attorney, Agent, or Firm* — Schwegman, Lundberg & Woessner

(57) ABSTRACT

Approaches to both pulling and pushing digital media content, such as movies, electronic books, music, games and the like, are addressed. Hybrid systems are also addressed. A mechanism for selecting particular digital media content by a user, such as a particular movie, for example, is utilized in pull approaches. A mechanism for identifying users who have opted in is employed in push approaches. Digital media content is provided by a media server to one or more high speed wireless radios which transmit that content to users' mobile devices.

18 Claims, 9 Drawing Sheets

(56) References Cited

U.S. PATENT DOCUMENTS

2013/0215116 A1* 8/2013 Siddique et al. ............. 345/420
2013/0233916 A1* 9/2013 Tran ................ G06K 19/06037
                                                    235/375
2014/0324707 A1* 10/2014 Ayuso de Paul ..... H04L 63/061
                                                    705/71

* cited by examiner

METHODS AND APPARATUS FOR DOWNLOADING DIGITAL CONTENT

CROSS-REFERENCE TO RELATED CASE

U.S. application Ser. No. 13/222,139 filed on Aug. 31, 2011 is a related case and incorporated by reference herein in its entirety.

FIELD OF THE INVENTION

The present invention relates generally to improved methods and apparatus for downloading digital content, and more particularly to advantageous aspects of high speed wireless downloading approaches to supplement and expand upon digital content providing arrangements such as entertainment kiosks.

BACKGROUND OF THE INVENTION

A wide variety of entertainment kiosks are presently known, such as the Coinstar Redbox™ and the Blockbuster Express™, which provide digital media such as movies, music, games, books or the like for rental or purchase in the form of prerecorded material on CDs, DVDs, blue ray disks and the like.

FIG. 1 illustrates a prior art kiosk 100 for rental and sale of DVDs and the like, such as the NCR SelfServ Entertainment 2381 DVD rental kiosk. The kiosk employs a touch screen display 110, a magnetic stripe card reader 120, a display area 130 for physical display of movie promotional material, a dispensing slot 132 for dispensing media, such as DVDs, and a customer receipt slot 135 for delivery of a customer receipt printed by a receipt printer (not shown).

As another example of a prior art technique for providing digital media, one current digital media download approach is based on secure digital (SD) cards as the primary media. A digital download kiosk 200 for use with such cards is illustrated in FIG. 2. To use the kiosk 200, a customer inserts an SD card. The flash card memories therein follow a non-volatile memory format developed by Panasonic, San Disk and Toshiba for use in portable devices such as digital cameras, mobile phones, video game consoles and the like. Digital rights management (DRM) protection can be embedded in the secure SD card which can utilize the content protection for recordable media (CPRM) format to protect digital media stored in secure storage therein.

Digital download systems like the system of FIG. 2 have many advantages. For example, they provide the ability to offer a wide range of entertainment content stored on a media server without the challenges of transporting and stocking physical inventory. Additionally, they allow the use of well-established and accepted digital rights management methods, such as CPRM, which is widely employed in the secure digital card consumer electronics flash memory format. U.S. Pat. No. 7,779,064 describes details of distributing digitally encoded content, such as movies, music, computer games to kiosk-like content-delivery systems, such as kiosk 100, and is incorporated by reference herein in its entirety.

Approaches to downloading content onto a user's cell phone, laptop, flash drive or the like have also been developed. To date, such approaches have required the media to be written to a user's device which is connected to the source of the content or which is in close proximity thereto. In most cases, downloading has been significantly slower than desired.

SUMMARY OF THE INVENTION

Among its several aspects, the present invention recognizes that high speed wireless communication technology, such as 60 GHz radio technology, may be advantageously utilized to radically extend, or even replace, existing digital media marketing techniques, as well as, to provide a wide range of entirely new marketing approaches. It is expected that this type of high-speed wireless radio technology will be integrated into many mobile devices in the near future, much as Bluetooth technology and wireless network (WiFi) technology is found in most current mobile devices.

Among its several aspects, the present invention addresses a system for pushing digital content to customers that have opted in to utilize a high speed wireless transmission network. It also addresses systems for pulling digital content selected by customers utilizing a high speed wireless transmission system, as well as, hybrid push and pull systems. The invention among its several advantages leverages existing kiosk approaches to providing digital content and provides techniques for building and improving upon existing radio networks as discussed further herein.

A more complete understanding of the present invention, as well as further features and advantages of the invention, will be apparent from the following Detailed Description and the accompanying drawings.

DETAILED DESCRIPTION

Existing self-service entertainment kiosks, such as the kiosks 100 and 200, for example, have some fundamental limitations which often cause them to fall short of user's expectations. For example, they are limited to only one or a few types of media, and can be too slow to dispense a customer's selections. Further, there may be bottlenecks when multiple potential users are unable to obtain their desired media quickly enough. Additionally, the present invention recognizes that more and more potential media consumers carry a cell phone, another mobile device such as an iPad™ or other tablet device, a laptop or the like having sufficient memory and wireless reception capability that digital media can be advantageously wirelessly downloaded thereto rather than providing the content on a recorded optical disk or the like. Further, the present invention recognizes that consumers are often in locations where they will spend an extended period of time, such as a movie cinema, an airline terminal, a grocery or other store, or the like where it is possible to piggyback on an existing high speed wireless coverage or where adding such coverage may enable a wide range of other marketing opportunities as addressed further below.

Figure 1:
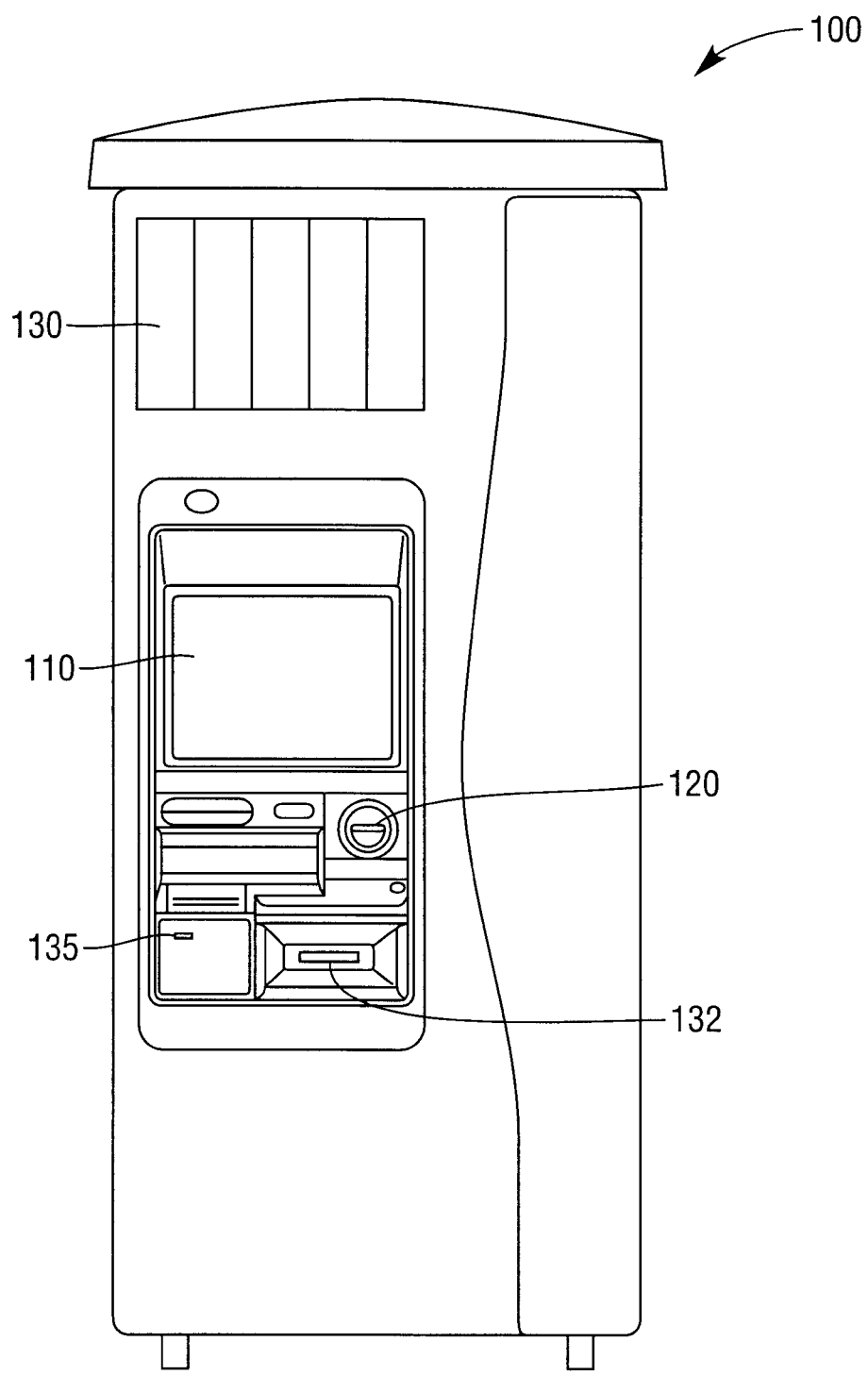
FIG. 1 shows a prior art kiosk for rental or sale of prerecorded media.
Figure 2:
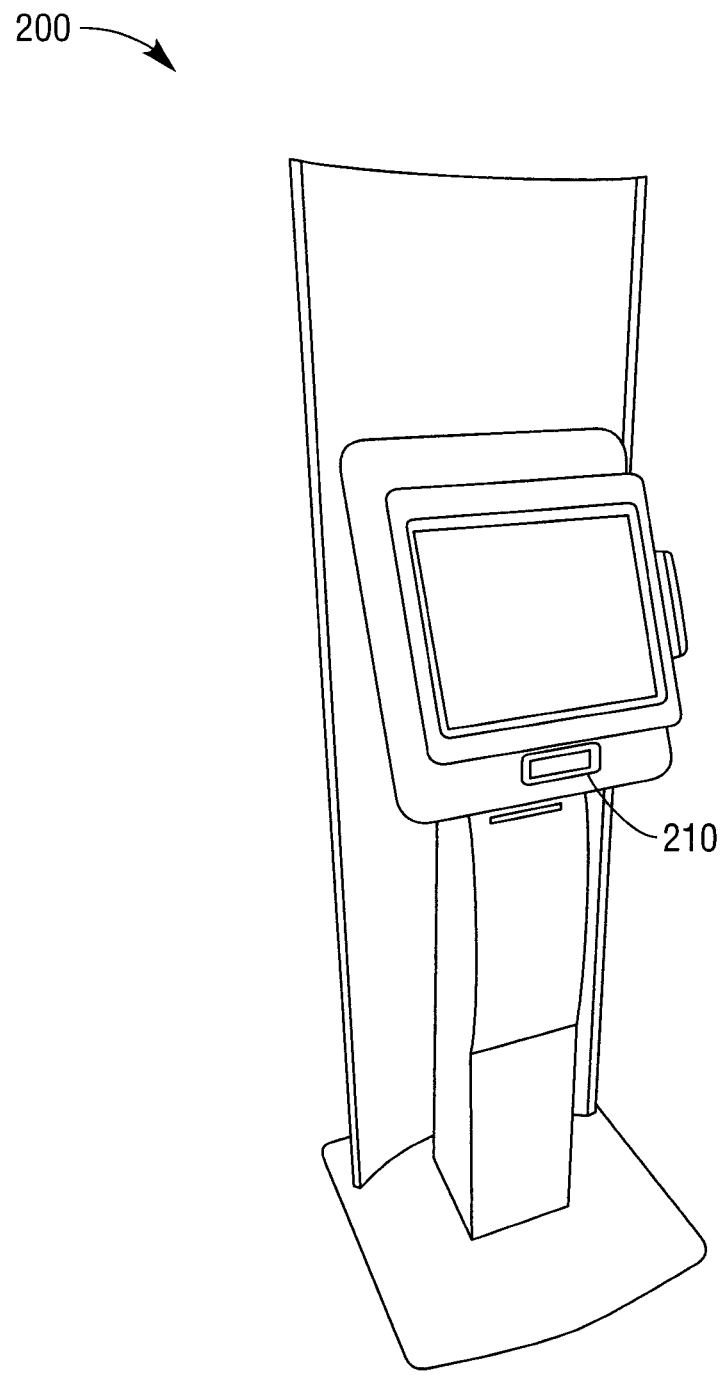
FIG. 2 shows a prior art digital download kiosk for downloading content to SD cards.
Figure 3:
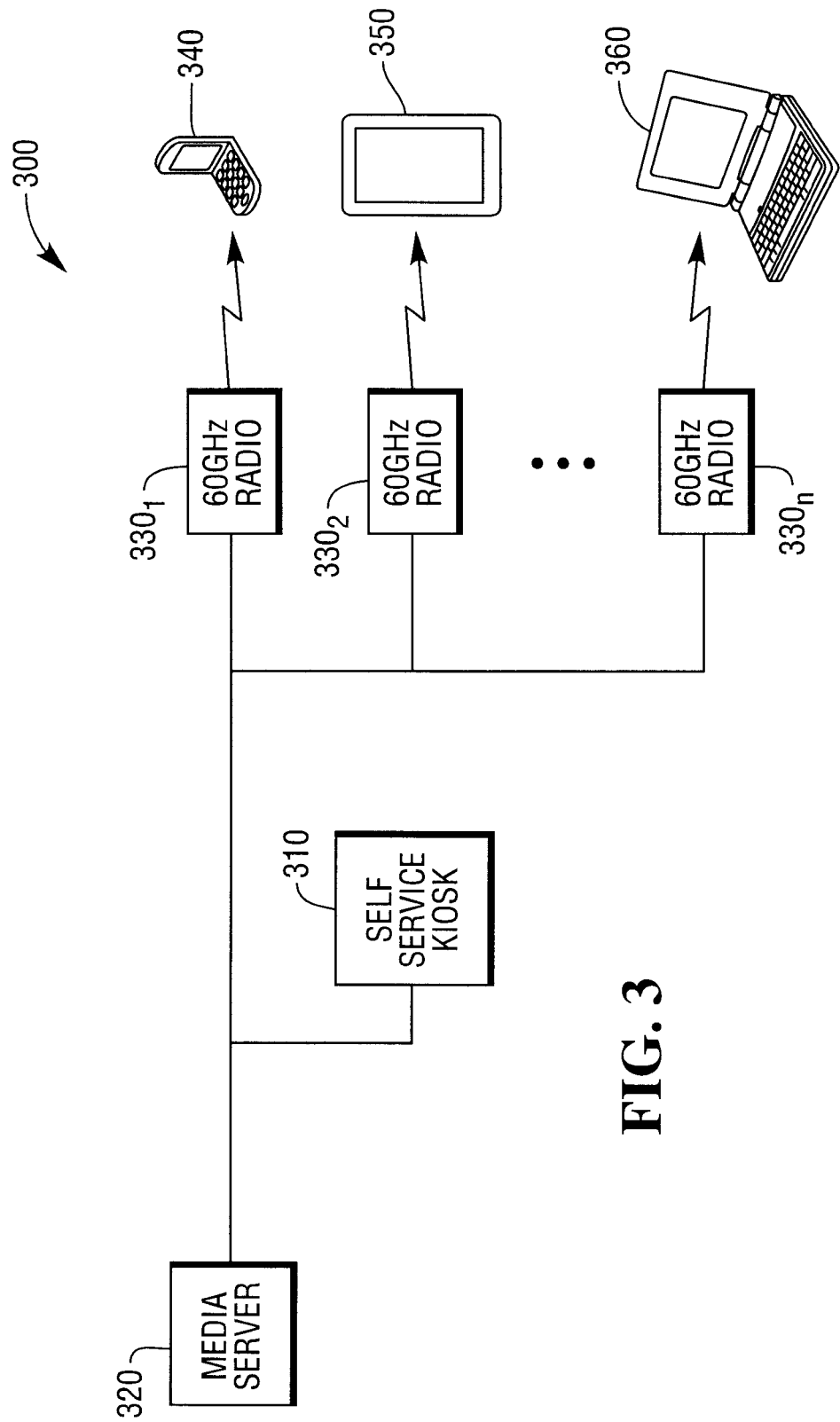
FIG. 3 shows an entertainment kiosk with high speed wireless access points in accordance with an embodiment of the invention.

Turning to FIG. 3, this figure shows a system 300 providing an entertainment kiosk with high speed wireless access points, such as 60 GHz access points. In FIG. 3, a self-service kiosk 310 is connected with a premise or enterprise media server 320 and a plurality of 60 GHz radios $330_1$, $330_2$ ... $330_n$ (collectively 330). These radios have a transmission range of as much as 10 meters. Consumers select and pay for content at the kiosk 310 which kiosk may be suitably implemented as either kiosk 100, kiosk 200 or some other kiosk, such as any of a wide array of existing kiosks.

In general, the teachings of the present invention may be readily adapted to the operation of a wide array of existing kiosks for rental or sale of DVDs or other media. For example, the general operation of kiosk 100 may generally follow that shown in FIGS. 28-35 and described by paragraphs [0130]-[0140] of U.S. Patent Application Publication No. 2007/0169132 published Jul. 19, 2007 which is incorporated by reference herein in its entirety. Such operation may be advantageously adapted for use in conjunction with the present invention as discussed further below.

By way of example, a consumer may select a movie to rent or buy using touch panel display 110, request that the movie be wirelessly downloaded to a cell phone, such as cell phone 340 of FIG. 3. A user can identify his or her cell phone by entering the cell phone's number using the touch panel 110 or by scanning a displayed bar code, quick response (QR) code or other indicia using the cell phone, and paying for the rental or purchase by swiping a credit card in card reader 120, for example. Alternatively, the charges might be billed to the cell phone 340. As further alternatives, the user might select media to be downloaded to any wireless device having high speed reception capability and adequate storage for the selected content, such as an iPad™, electronic book reader or other tablet 350, or laptop 360, for example. 3G, 4G, EVDO or like transmission technologies may be suitably employed. Phone 340, tablet 350 or laptop 360 have an application running thereon to enable the content to be received. This application may suitably include a utility to determine the amount of memory space available to download content, and to control downloading accordingly. For example, a media download may be blocked and the user notified that a previously watched movie must be deleted or overwritten to allow a subsequent download. Display screens may automatically pop up giving the user the option to block content when memory is low or to immediately delete any unwanted content.

The server 320 maintains a secure library of content, such as movies, music, books, games or the like, and after the users have selected the digital content and paid therefor using the kiosk 310, content is transmitted to the users' mobile devices via one or more of the 60 GHz radios 330, for example, as the user moves through a cinema as discussed further below in connection with FIG. 5 below, a retail store (FIG. 6), the airport (FIG. 7), or another business environment in which the invention is implemented.

Figure 4:
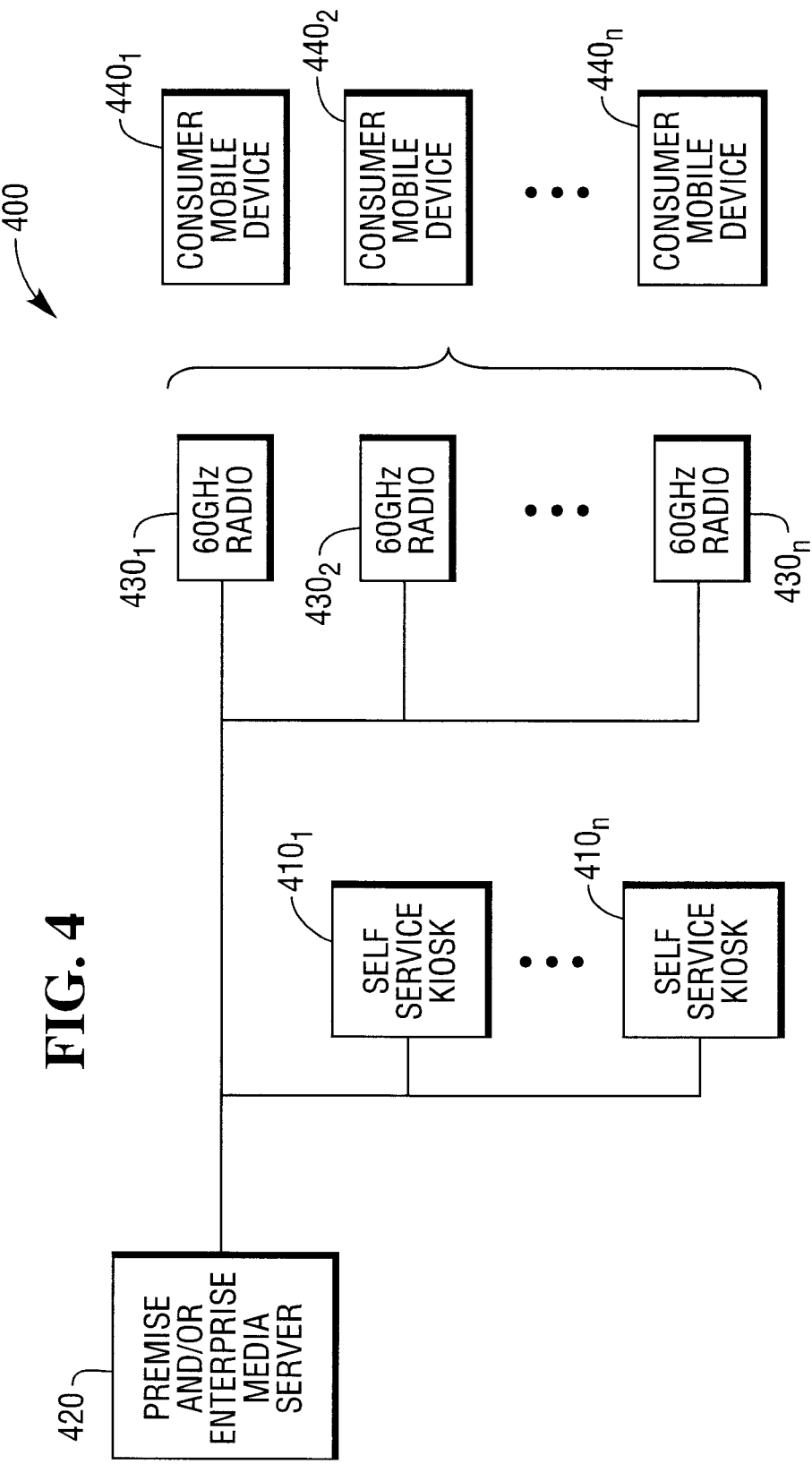
FIG. 4 shows a cluster of entertainment kiosks with high speed wireless access points in accordance with a further embodiment of the invention.

FIG. 4 illustrates a system 400 in which a plurality of kiosks $410_1$, $410_2$ ... $410_n$ (collectively 410) are connected to a content providing media server 420 and a plurality of 60 GHz radios $430_1$, $430_2$ ... $430_n$ (collectively 430) which transmit user selected content to user mobile devices $440_1$, $440_2$ ... $440_n$ (collectively 440). Again, as was the case for the system 300 of FIG. 3, consumers select and purchase content via one of the kiosks 410. This content may be suitably downloaded to user devices, such as cell phones, from media server 420 through the 60 GHz radios 430. It will be recognized that while the system 400 may suitably employ a plurality of existing kiosks, such as Blockbuster Express™ kiosks manufactured by NCR Corporation, it will be recognized that the present invention has the advantage of supporting operation with any compatible kiosk. Thus, while DVD kiosks may be presently preferred, it is anticipated that the present systems may be utilized in conjunction with ATMs, reservation kiosks, information kiosks or the like where the software of those products has been updated to support media selection and payment, as well as communication being established with a media server, such as the server 420.

Further, while the kiosk based embodiments may be principally viewed as "pull" embodiments where a user selects content to be downloaded, it will be recognized that consistent with the teachings below in connection with FIGS. 5-7 regarding pushing content to users that opt in, that a hybrid "push" and "pull" arrangement may be employed. In a push approach users of mobile devices, such as devices 340, 350, 360 and 440 may opt to have content they did not select pushed to their device, such as trailers for coming attractions at a movie cinema, coupons at a mall and the like. Thus, when radios 330 and 430 are not busy transmitting to a paying customer, they may be employed in a wide range of advantageous marketing approaches.

Figure 5:
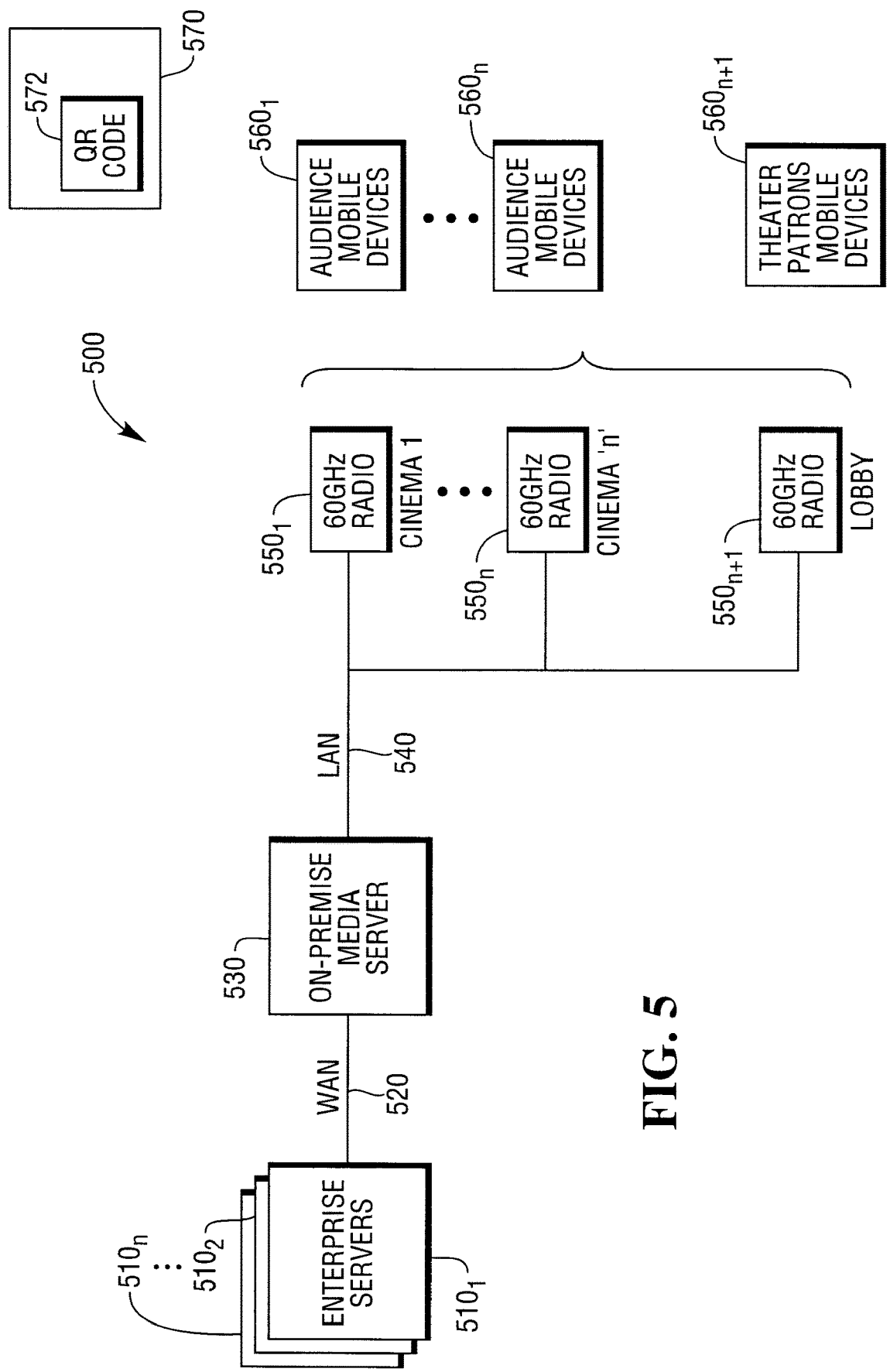
FIG. 5 illustrates a cinema content distribution system employing high speed wireless access points in accordance with another embodiment of the invention.

FIG. 5 illustrates a cinema content distribution system 500, for use in an environment such as a movie theater having sixteen screens for showing movies to patrons in sixteen different cinemas, in accordance with an embodiment of the invention. Among its several aspects, this embodiment supports the mass distribution of encrypted content to consumers that enroll with a content provider, thereby opting in. Enrolled consumers may express an interest in movies of particular genres, starring certain actors, recent releases, or the like. Enrollment can be done over the Internet at a content providers' website, or by making use of consumer and content provider presence and preferences on a social networking site, by scanning a QR code or other code in the cinema lobby, or the like. Utilizing this approach, a large number of enrolled consumers can receive dormant content on a cell phone or other mobile device, such as while watching a movie at a cinema or waiting for a flight at their airport gate. To unlock that content, a decryption or "unlock" key can be obtained and paid for over an Internet connection. Somebody wanting to see a coming attraction as soon as possible can download the encrypted content for that movie and then obtain the unlock key once availability begins. An alternative ending to a movie one is watching at a cinema can be downloaded along with promotional material and unlocked upon watching that promotional material. A host of new possibilities are presented hereby.

In FIG. 5, enterprise servers $510_1$, $510_2$ ... $510_n$ (collectively 510) are connected by a wide area network (WAN)

520 to an on-premise media server 530. The media server 530 is connected by a local area network (LAN) to a plurality of 60 GHz radios $550_1$ . . . $550_n$ and $550_{n+1}$ (collectively 550) which transmit content wirelessly to audience mobile devices $560_1$ . . . $560_n$ and $560_{n+1}$ (collectively 560). In the embodiment shown, one, or if needed, more than one radio is assigned to each cinema at the theater, and one, or if needed, more than one radio is assigned to the lobby of the theater. The network of radios 550 is preferably designed to cover the areas of the theater where patrons spend time, and may be advantageously designed to detect both an audience mobile device within a transmission zone and as the audience mobile device moves from one transmission zone to another, and then to hand off a moving device from cell to cell of the network as a user moves through the cinema in this embodiment, or an airport, store, mall, or the like, in other embodiments.

In the embodiment shown, movie studios, such as Sony, Warner Brothers, Fox and the like provide digital movie content to local theaters. This content is stored on one or more of the enterprise servers 510 and includes the movies currently being shown. Building on this existing infrastructure, these suppliers may readily make other content available to theater customers as discussed herein. While a single media server 530 is shown in FIG. 5, it will be recognized plural servers may be employed as needed. The media server 530 consolidates and stores content, and through the radios 550 broadcasts locked media to members of audiences of the theater if those audience members have opted in.

Audience members, if enrolled or opted in, receive unsolicited locked content to their mobile devices while waiting in the lobby or enjoying their movie. Should they elect to purchase this content, a quick transaction is done on their mobile device to acquire an unlock code or a decryption key. If they do not want to consume the media, it can be deleted off their mobile device.

With respect to a further approach to enrollment and opting in, FIG. 5 includes a representation of a movie screen 570 for cinema 1. Displayed on the screen 570 is a QR code 572. It is typical in many movie theaters today to have an extended period of both advertising and previews for coming attractions prior to the main attraction starting. During either or both of these periods, a display on the screen or an aural announcement through the cinema's speakers may make patrons aware that if they want to opt in they should take a photograph of the QR code 572 on the screen. An advantage of this technique is that it can be leveraged to improve upon the opportunity provided to regular advertisers and previously existing advertising programs of the theaters. For example, a local restaurant advertising on the movie screen could provide a coupon corresponding with a QR code. The theater could also solicit email addresses of patrons interested in seeing a coming attraction and send them an email reminder when the attraction is about to reach the theater.

As one example of the present invention, the movie patron waiting to get content for the first time opts in by taking a picture of the QR code with a cell phone. The cell phone then automatically opens a uniform resource locator (URL) and downloads an applet to support the downloading. The opting in can be a general choice, such as, "I am interested in seeing what you think I might be interested in", or a more specific, "I am interested in an earlier particular movie starring one or more characters of the movie I am seeing shortly", or of course any of a wide range of variations. A list of options on the display of the customer's phone is one way to provide the user with such choices.

Figure 6:
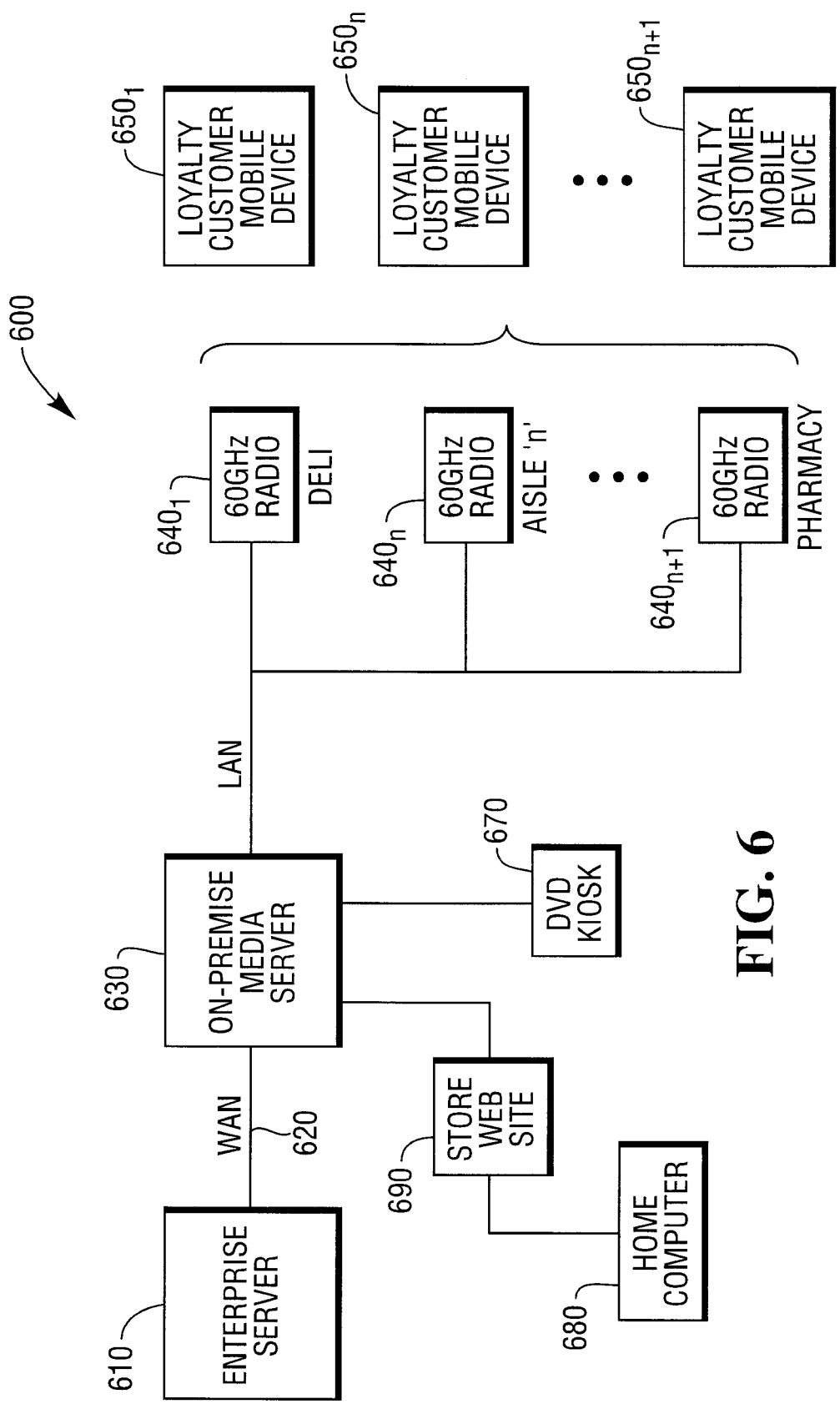
FIG. 6 illustrates a retail store content distribution system with high speed wireless access points in accordance with a further embodiment of the invention.

FIG. 6 shows a store content distribution system 600 in accordance with an embodiment of the invention. In the embodiment shown, system 600 is deployed in an environment such as a grocery store, a retail store, a super store combining grocery, retail, a deli, pharmacy, auto repair, tire store, and the like, or a mall having multiple stores. For a single retail enterprise, the retailer's enterprise application runs on an enterprise server 610 which creates and distributes marketing offers to stores. Consumer goods manufacturers (CGMs), such as Coke, Pepsi, Procter & Gamble and the like also can send coupons to the stores to promote their brands and products. The enterprise server 610 is connected by a WAN 620 to an on-premise media server 630. This local store server stores content, coupons, loyalty rewards and the like, and delivers that content utilizing a network of 60 GHz radius $640_1$, $640_2$, . . . $640_n$ (collectively 640) to cell phones and other customer mobile devices $650_1$ . . . $650_n$ and $650_{n+1}$ (collectively 650) of enrolled loyalty customers of the store.

Utilizing the system 600, stores can aggregate a wide array of offers, such as complimentary media, such as a song or ringtone of the day, cooking videos for preparing a meal utilizing one or more ingredients on special, free games for the children, and the advantage of delivering offers to shoppers that have opted in by enrolling in their loyalty program only when they are at the store if that is when they prefer to get them. A system of radios 640 located in each aisle, department or other portion of the store, such as the deli, the pharmacy and the like delivers content wirelessly to loyalty customer mobile devices 650.

Stores often have a DVD kiosk 670 near an entrance to the store where a user can order and pay for a movie or other digital media content to be downloaded while shopping. Another option for ordering is a home computer 680 linked to media server 630 through a store web site 690.

With the approach of the present invention, location based delivery may be enabled, since many consumers may not want to be bothered with coupons when they are not at a store where they can be used, coupons can be accumulated and only delivered upon consumer request or upon their arrival at the appropriate store to use them.

Figure 7:
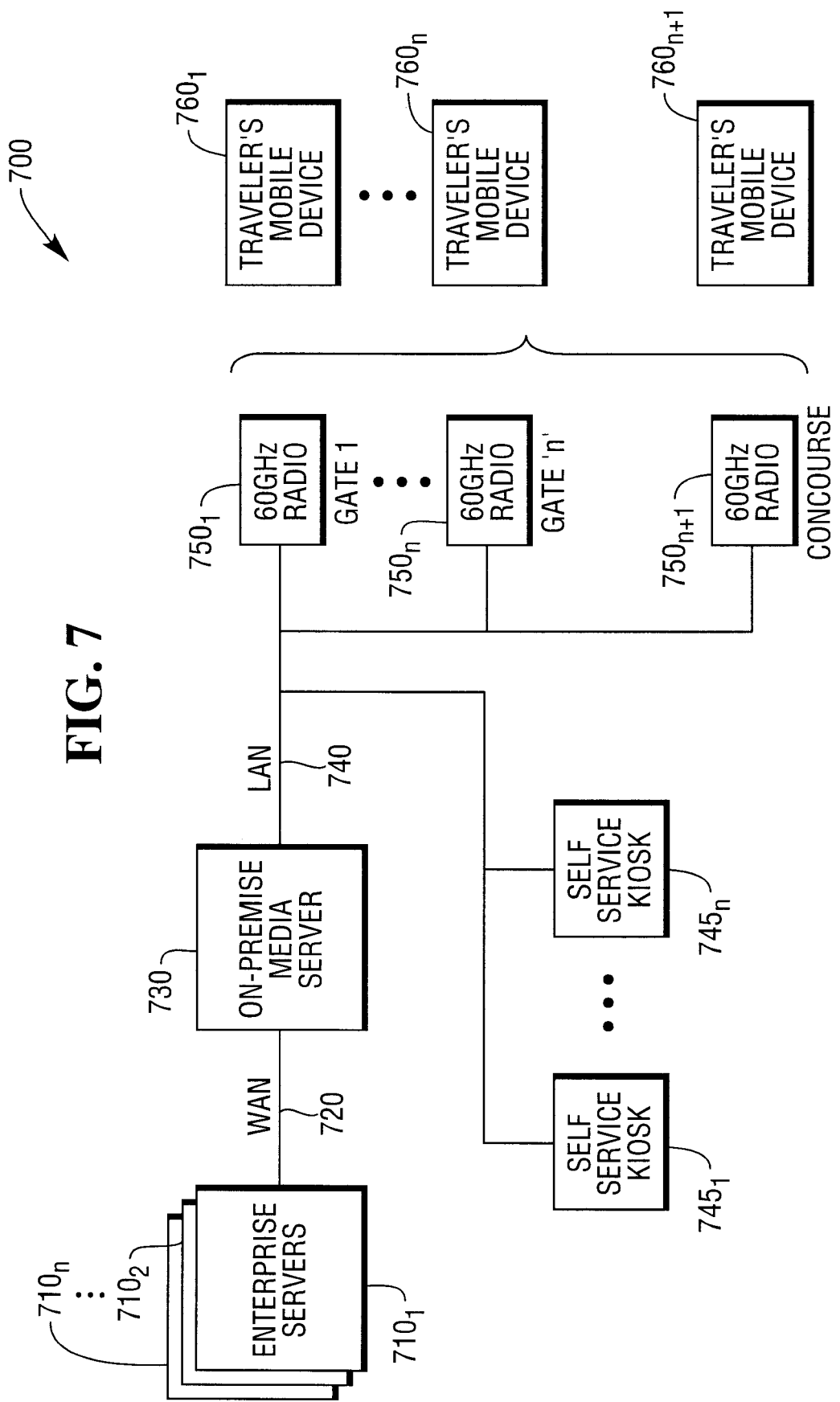
FIG. 7 illustrates an airport media distribution system with high speed wireless access points in accordance with a further embodiment of the invention.

FIG. 7 shows an airport media distribution system 700 in accordance with an embodiment of the invention. In system 700, a plurality of enterprise servers $710_1$, $710_2$ . . . $710_n$ (collectively 710) store content from studios, for example, and provide content over a wide area network (WAN) 720 to one or more on-premise airport media servers 730. The airport media server 730 stores content and provides that content over local area networks (LAN) 740 to 60 GHz radios $750_1$ . . . $750_n$ and $750_{n+1}$ (collectively 750). The radios 750 broadcast content to mobile devices $760_1$, $760_2$ . . . $760_n$ (collectively 760) of travelers that have opted in. Alternatively, self-service kiosks $745_1$, $745_2$ . . . $745_n$ (collectively 745) located around the airport may be utilized by travelers to select and pay for content, such as movies, music, books, and games, for example, and this selected content is broadcast to their mobile devices 760. Alternatively, travelers may also select and pay for content directly with a mobile device 760, such as a mobile phone.

Figure 8:
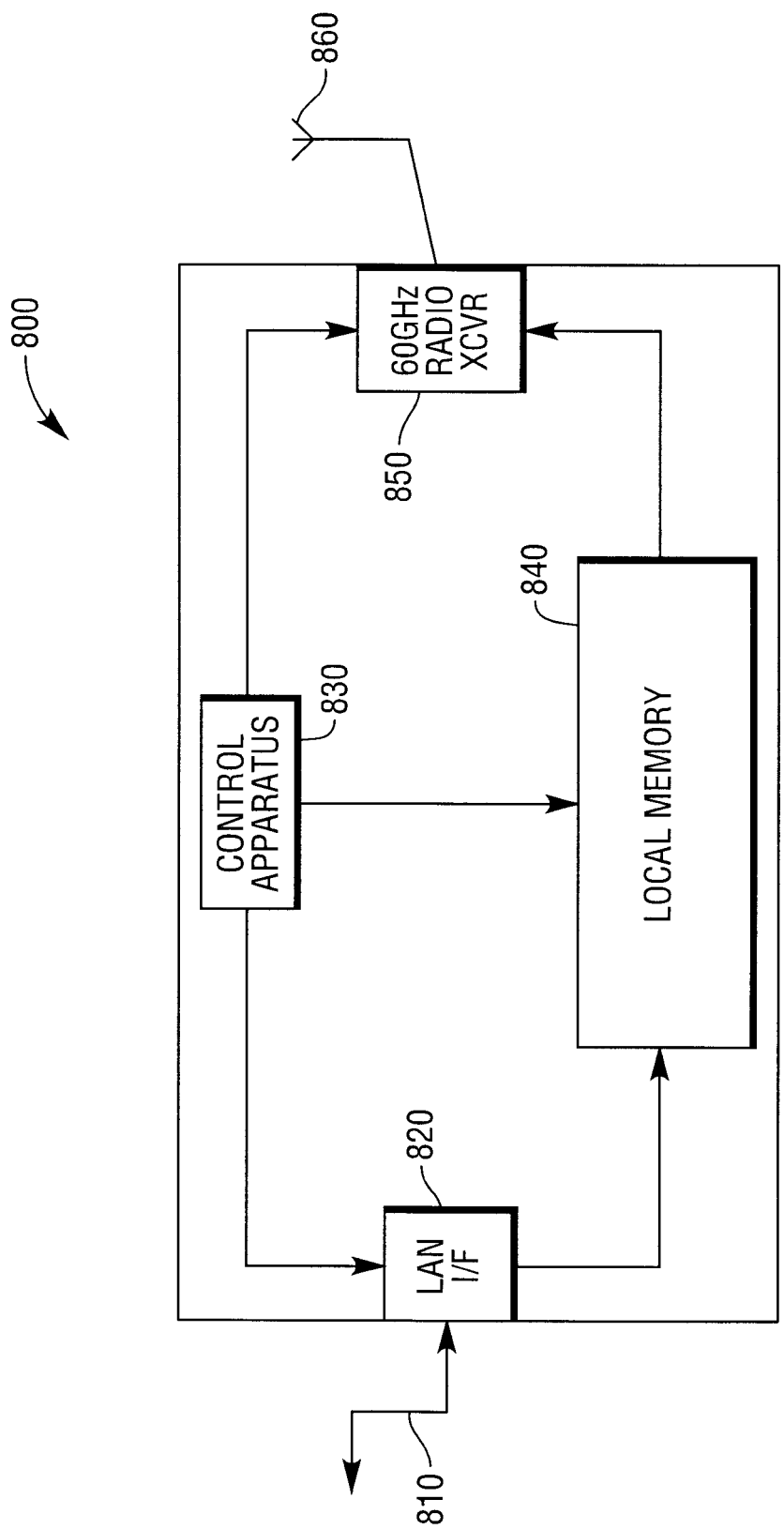
FIG. 8 shows a 60 GHz radio module system for use in any of the embodiments of the invention.

FIG. 8 shows an exemplary embodiment of a 60 GHz radio 800 suitable for use in FIGS. 3-7. In FIG. 8, radio 800 communicates with a media server, such as one of the servers 320, 420, 530 or 630 or a kiosk utilizing a local area network (LAN) connection 810 which is connected to a LAN interface 820. The network connector is preferably a 10/100/1000 base T network connection which supports up to 1 Gb/s data transfer. The LAN interface 820 is compatible with the LAN connection 810 and is controlled by control apparatus 830 and routes content data to a local memory 840 which is controlled by the control apparatus 830 to buffer selected media files or portions thereof for faster transport. Buffered content data is transferred from local memory 840 to a 60 GHz radio transceiver 850 which is controlled to transmit content to user mobile devices at 3 Gb/s or more utilizing transmitting antenna 860. As an alternative, USB 2.0 or USB 3.0 might be employed instead of the LAN, especially if the 60 GHz module is connected directly on a one-to-one basis to a kiosk and not shared by multiple kiosks and users.

Figure 9:
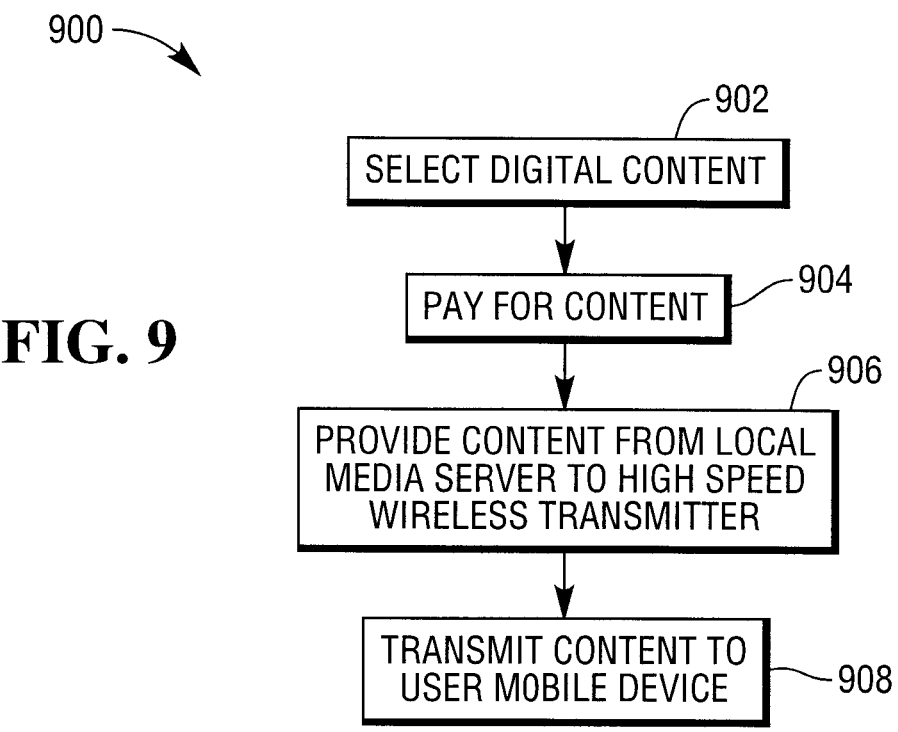
FIG. 9 shows a pull process of high speed wireless downloading of digital content in accordance with the present invention.

FIG. 9 shows a process 900 of pulling content to a user mobile device in accordance with the present invention. In step 902, a user selects digital content utilizing a kiosk, such as one of the kiosks 100, 200, 310, or 410, or utilizing a user device, such as a cell phone, iPad™ or laptop, for example. In step 904, the user pays for that content, for example, by swiping a credit card in card reader 120, or by charging the amount due to a mobile phone. In step 906, the selected content is provided by a local media server to a high speed wireless transmitter capable of transmitting at a rate of at least 3 GB/s or more. In step 908, the content is transmitted to a user mobile device, such as a mobile phone, tablet computer, laptop or the like.

Figure 10:
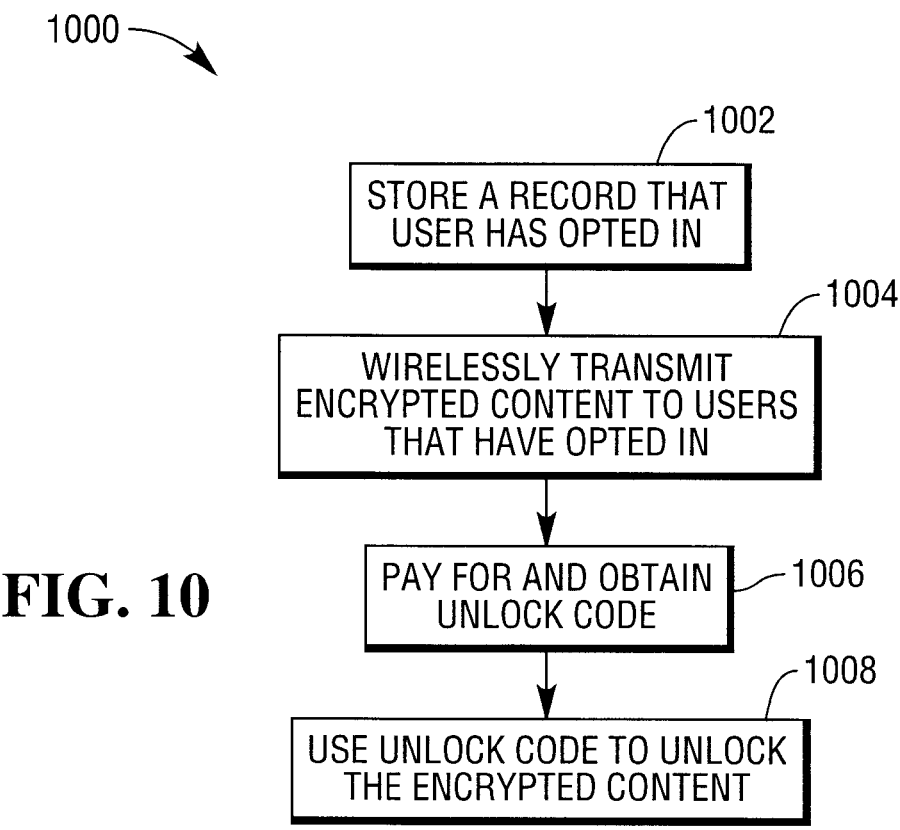
FIG. 10 shows a push process of high speed wireless downloading of digital content in accordance with the present invention.

FIG. 10 shows a process 1000 of pushing content to a user mobile device in accordance with the present invention. In step 1002, a user opts in to receive pushed content and a record of this opting in is stored. In step 1004, locked or encrypted content is wirelessly transmitted at 3 GB/s or more to a user mobile device. In step 1006, the user pays for and obtains an unlock code for the downloaded content. In step 1008, the unlock code is utilized to unlock the encrypted content corresponding thereto.

While the present invention is disclosed in the context of a presently preferred embodiment, it will be recognized that a wide variety of implementations may be employed by persons of ordinary skill in the art consistent with the above discussion and the claims which follow below. For example, while separate push and pull processes are described above, it will be recognized that a hybrid push and pull system may be highly desirable in certain environments. Further, while multiple embodiments have been addressed to illustrate the applicability of the invention concepts, it will be recognized that they may be adapted to other contexts where people spend time waiting, such as a sports stadium or arena, a restaurant, gas pump, building lobby, a bowling alley, a doctor's waiting room, a government office such as a driver's license bureau or social security office. In all these cases, as well as others, an opportunity to market a product, such as a movie, an electronic book, or music may be integrated with the opportunity for providing other business related information or marketing materials. For example, businesses and other service providers are always seeking feedback. Someone might get a free music download or a purchase credit good towards other content for filling out a survey. As a further example, co-marketing arrangements may be supported where a retailer might partner with a movie theater, such that opt-in mechanisms are linked and digital content is pushed in any of the co-marketing businesses' locations.

I claim:

1. A system for high speed wireless downloading of pulled digital media content comprising:
    a media server storing a library of digital media content for selection;
    a mechanism provided as a first kiosk to select particular digital media content by a user from the library of digital media content and to identify a mobile device by the mobile device scanning a Quick Response (QR) code presented on a touch panel causing the mobile device to after the mobile device scans the OR code to open a Uniform Resource Locator (URL) and to download an applet that supports downloading of the digital media content to the mobile device;
    a mechanism provided as a content provider to deliver a decryption key for unlocking the particular digital media content over an Internet connection, wherein the content provider provides the decryption key when payment is received for the decryption key;
    a high speed local communication network connection device;
    a plurality of high speed wireless radios connected to the media server by the high speed local communication network connection device to receive the particular digital media content selected by the user from the media server; and
    an application executing on the mobile device;
    wherein each of the high speed wireless radios situated throughout a store of an enterprise, and a select one of the high speed wireless radios to transmit the particular digital media content to the mobile device of the user in a defined transmission zone covered by the select high speed wireless radio within the store, wherein the defined transmission zone is up to 10 meters from where the select high speed wireless radio is situated within the store, the mobile device identifies itself by the mobile device taking a picture of a displayed Quick Response (QR) code with a camera of the mobile device within the store, wherein the media device obtains the decryption key separately from the particular digital media content and the particular digital media content is playable on the mobile device with the decryption key, wherein the application determines whether the mobile device has a sufficient amount of space for receiving the particular digital media content and blocks download when there is an insufficient amount of space and instructs user to remove from the mobile device any previously downloaded digital media content before the particular digital media content can be stored on the mobile device.

2. The system of claim 1 wherein the high speed local communication network connection device is a high speed local area network.

3. The system of claim 1 wherein the high speed local communication network connection device is a high speed universal serial bus (USB) connection.

4. The system of claim 1 wherein said high speed wireless radios transmit to the mobile device of the user at a rate of at least 3 Gb/s.

5. The system of claim 1 wherein the first kiosk also vends digital media content optically recorded on a disk and comprises the touch panel display for making user selections.

6. The system of claim 1 wherein at least one high speed radio comprises a 60 GHz radio having a transmission range of up to ten meters.

7. The system of claim 1 wherein the high speed local area network connection device transmits digital media content from the media server to the one or more high speed wireless radios.

8. The system of claim 1 wherein plural high speed wireless radios are networked to provide extended transmission coverage throughout areas where users move within a particular premise, and are controlled to provide automated handoff from one 60 GHz radio to an adjacent 60 GHz radio.

9. The system of claim 1 wherein if the mobile device of the user is detected as leaving the transmission zone, transmission is stopped, and upon detection of the mobile device of the user reentering the transmission zone, transmission is recommenced whereby multiple session transmission is supported by the system.

10. A method for high speed wireless downloads of digital media content processed on a media server and a mobile user device, comprising:
  registering a mobile device through receipt of a cell number at a kiosk by the mobile device scanning a Quick Response (QR) code presented on a touch panel of the kiosk, wherein scanning the OR code causes the mobile device to open a Uniform Resource Locator (URL) and to download an applet that supports downloading of the digital media content to the mobile device;
  storing a library of digital media content on the media server;
  selecting particular digital media content from the library of digital media content;
  detecting the mobile user device within a transmission zone from a plurality of transmissions zones, each transmission zone situated within a store of an enterprise and each transmission zone serviced by a particular high speed wireless radio, and each high speed wireless radio transmitting up to 10 meters from where each high speed wireless radio is situated, and identifying the mobile user device when the mobile device takes a picture using a camera of the mobile user device of a displayed Quick Response (QR) code within the store and in response to identifying the mobile user device identifying that the mobile user device is to receive the particular digital media content;
  providing the selected particular digital media content by the media server to the particular high speed wireless radio over a high speed local communication connection device;
  transmitting the selected particular digital media content from the particular high speed wireless radio to the mobile user device, and wherein transmitting further includes transmitting the selected particular digital media content as encrypted content that can be played on the mobile user device when a decryption key is separately obtained from the selected particular digital media content when payment is received for delivery of the decryption key from a content provider over an Internet connection;
  determining, by the mobile user device, when there is an insufficient amount of space available on the mobile user device and instructing the user to remove from the mobile user device any previously downloaded digital media content before the particular digital media content can be stored on the mobile user device.

11. The method of claim 10 wherein the step of selecting digital content is performed utilizing the kiosk.

12. The method of claim 10 wherein the step of selecting digital content is performed utilizing a touch screen of the kiosk by a user.

13. The method of claim 10 wherein plural high speed wireless radios are networked to provide an extended transmission coverage zone throughout areas where customers move within a premise.

14. The method of claim 13 wherein the plural high speed wireless radios are 60 MHz radios.

15. The method of claim 10 wherein the media content comprises movies.

16. The method of claim 10 wherein the high speed local communication network device comprises a high speed local area network or a high speed universal serial bus (USB) connection.

17. The method of claim 13 further comprising:
  providing automated handoff from one 60 MHz radio to an adjacent 60 MHz radio as the user moves from one coverage zone to another.

18. The method of claim 13 further comprising:
  detecting the mobile device of the user has left the extended coverage zone and stopping transmission; and
  recommencing transmission upon detection of the mobile device of the user reentering the extended coverage zone.

* * * * *